United States Patent [19]
Jones, Sr.

[11] Patent Number: 4,951,696
[45] Date of Patent: Aug. 28, 1990

[54] HUNTING STAND

[76] Inventor: Gordon E. Jones, Sr., 1111 Berkley Dr., Brownsville, Tenn. 38012

[21] Appl. No.: 379,617

[22] Filed: Jul. 14, 1989

[51] Int. Cl.$^5$ ............................................. A01M 31/00
[52] U.S. Cl. ....................................... 135/90; 135/901; 43/1
[58] Field of Search .................... 135/90, 901, 87, 101; 43/1

[56] References Cited

U.S. PATENT DOCUMENTS

| | | | |
|---|---|---|---|
| 3,116,808 | 1/1964 | Riley | 135/901 |
| 3,509,891 | 5/1970 | de Bolt | 135/901 |
| 3,799,608 | 3/1974 | Smutny et al. | 135/901 |
| 4,805,655 | 2/1989 | Justice | 135/901 |
| 4,813,441 | 3/1989 | Kepley | 135/901 |

Primary Examiner—David A. Scherbel
Assistant Examiner—Caroline D. Dennison
Attorney, Agent, or Firm—John J. Mulrooney

[57] ABSTRACT

A hunting stand useful to provide an elevated hunting station for rifle and bow hunters has a basket shape and comprises a structure having a flat bottom member, a plurality of support members extending upwardly from the base to a top rail which encircles the space above the base member, and a seat supported by the upwardly extending members at a position between the base and top rim; spike means project from the rear of the base and top rim members for engaging the tree where the stand is mounted, and a pair of sleeves extend downwardly from the front of the base member for receiving the side pieces of a ladder extending from the ground to the stand. In a first embodiment of the invention, the several parts are welded together to form a rigid, permanently erected hunting stand; in a second embodiment of the invention, the several parts are rotatably and releasably connected to form a collapsible hunting stand capable of folding for easy storage and transport.

6 Claims, 4 Drawing Sheets

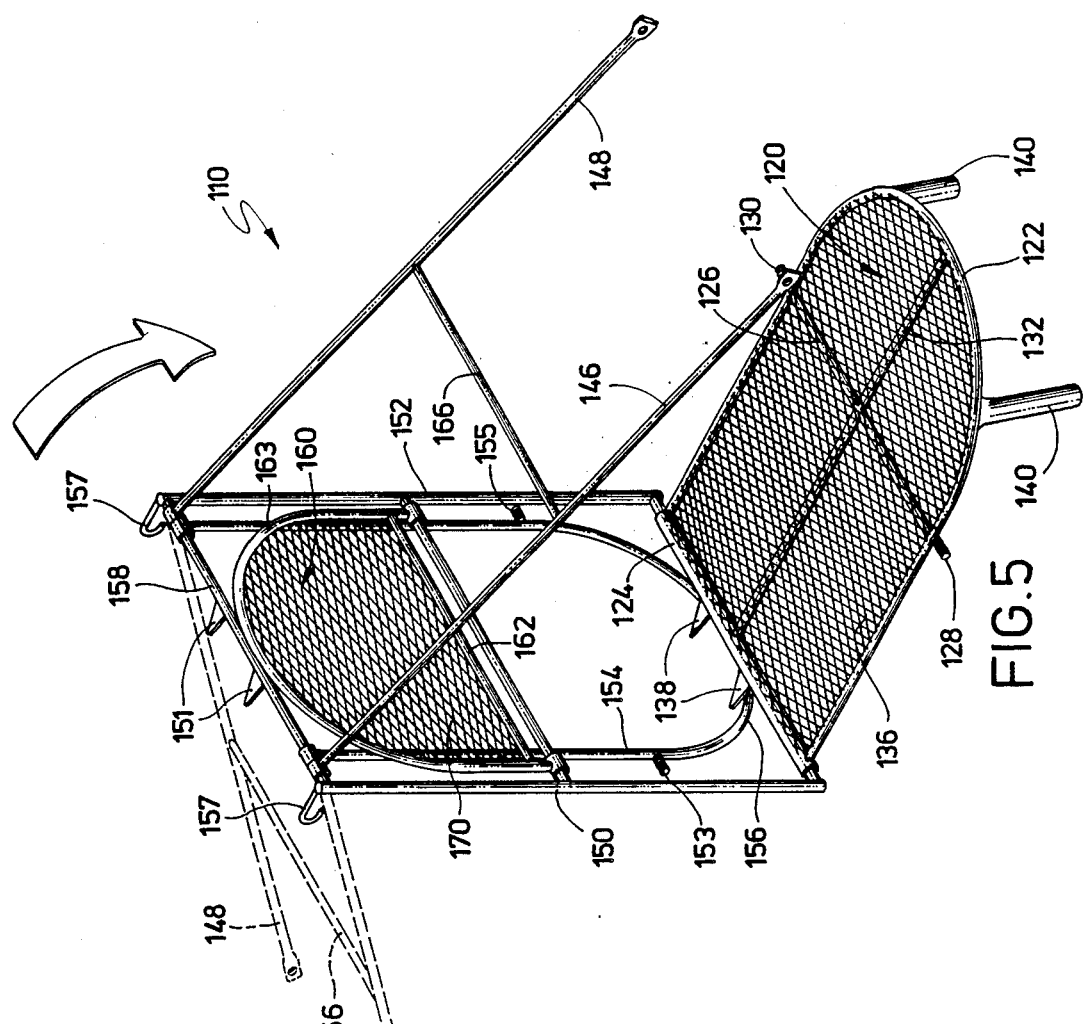
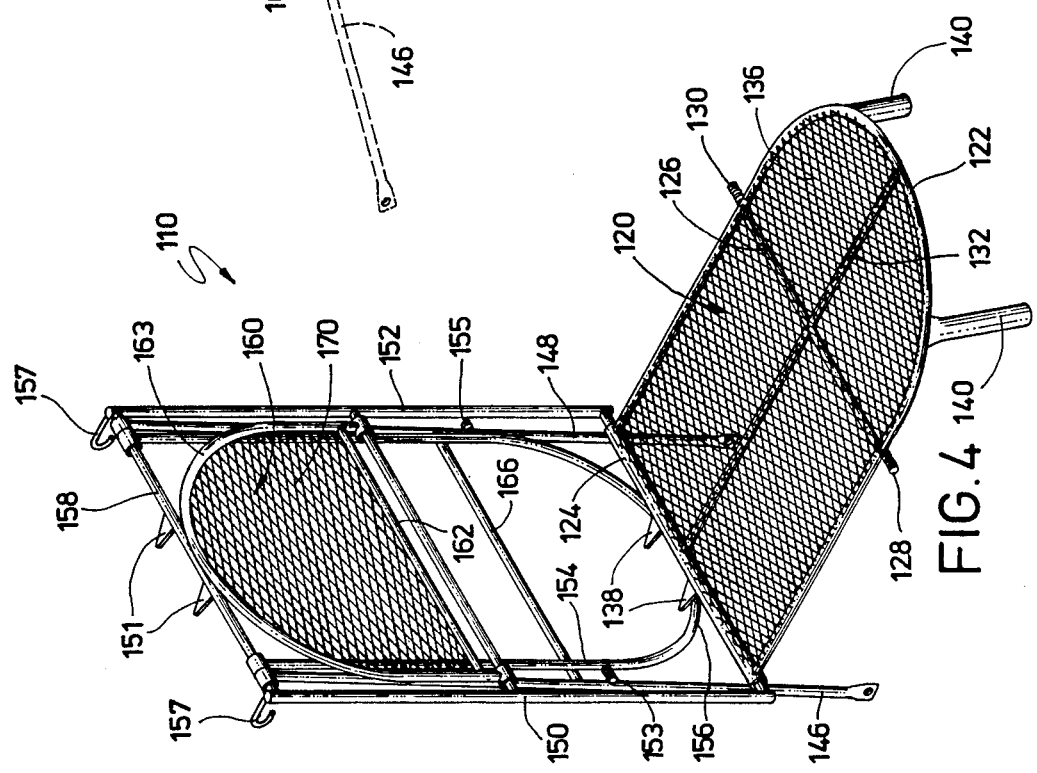

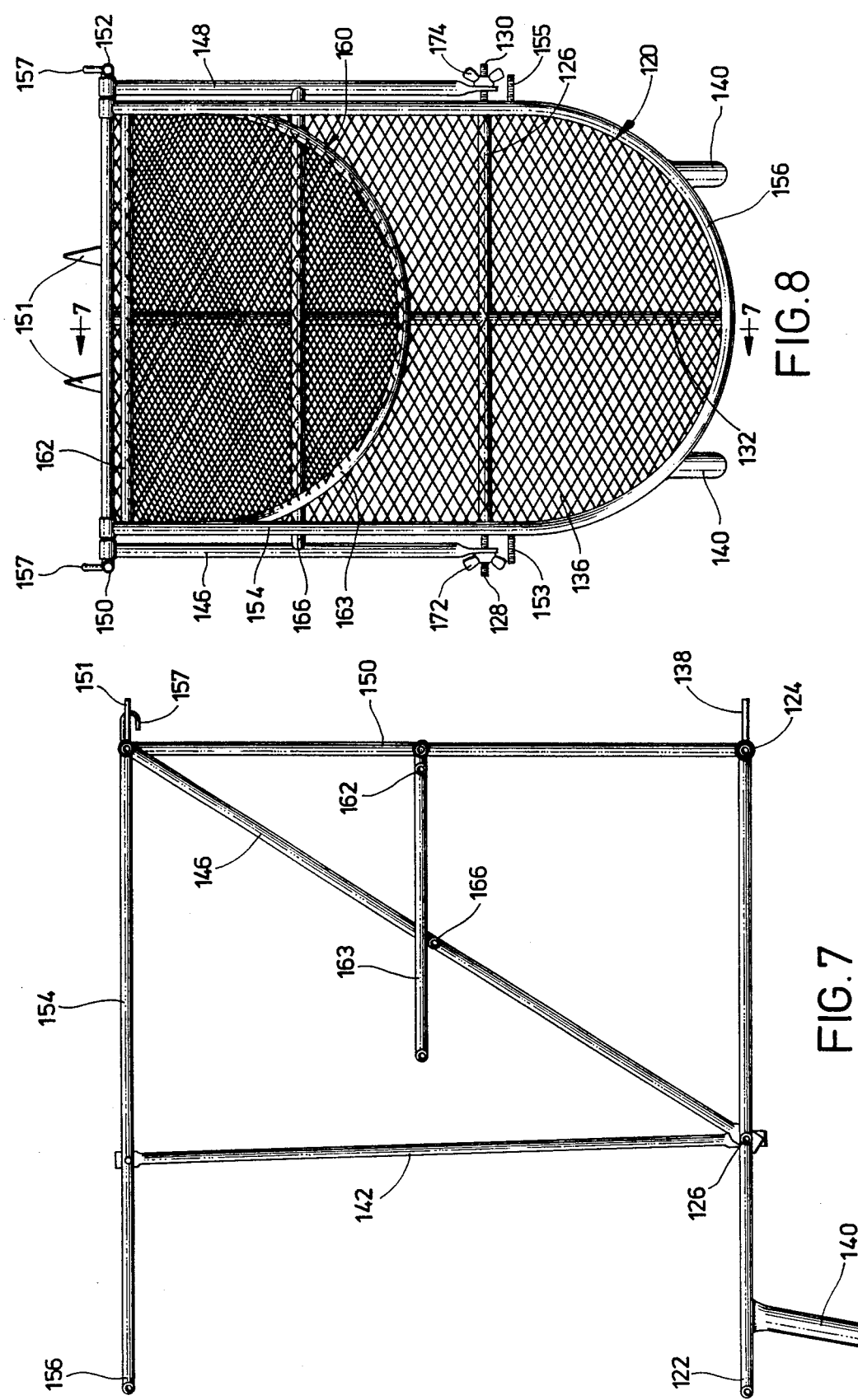

HUNTING STAND

BACKGROUND OF THE INVENTION

This invention relates to hunting stands and more particularly to a stand of the type used by rifle and bow hunters which is capable of being mounted in an elevated position such as in a tree.

The prior art hunting stands known to the inventor generally comprise relatively large, heavy and rigid structures whose utility diminishes in direct relation to the distances which such cumbersome equipment must be carried through woods and over rough terrain. Such prior art stands are difficult to erect in an elevated position in a tree and because of design, pose a safety hazard because either the stand itself is unstable in its elevated position or the hunter can easily fall out or off of the stand. Moreover, the prior art stands have not been designed for the comfort of the hunter and are not very effective at camouflaging the hunter's presence and motion while he is positioning himself for a shot at the quarry.

Therefore, an object of the invention is to provide an improved hunting stand.

Another object of the invention is to provide a hunting stand which is lightweight, yet sturdy and durable.

Another object of the invention is to provide a hunting stand which is comfortable and safe for the hunter.

Another object of the invention is to provide a hunting stand which is collapsible for ease of transport and storage.

Another object of the invention is to provide a hunting stand which features a basket-type construction for safety and comfort.

Another object of the invention is to provide a hunting stand which has a camouflage feature to block the hunter's movements from the quarry.

Another object of the invention is to provide a hunting stand which is adaptable for either rifle or bow hunting.

Another object of the invention is to provide a hunting stand which is capable of being carried long distances, erected, and disassembled by a single hunter.

SUMMARY OF THE INVENTION

The hunting stand of this invention comprises a basket-type structure having a base made of wire mesh, frame members in the form of rods which extend upwardly from the base to a top rim which surrounds the area defined by the base, a seat made of wire mesh and supported by said frame members intermediate the base and the top rail, spikes project outwardly from the rear of the base and top rim for engaging a tree or other structure where it is desired to mount the stand, a pair of sleeves extend downwardly from the front of the base and are adapted to engage the top ends of the sidepieces of a ladder which will extend from the ground to the stand and provide support, stability, and access thereto. In one embodiment, the frame members are rigid and all parts are welded together; in a second embodiment, the stand members are rotatably and releasably connected so that the stand is foldable.

In accordance with the present invention, one embodiment of the hunting stand is constructed of lightweight metal tubing assembled and welded in the shape of a basket frame having a base defining a plane surface covered by a wire mesh, a plurality of support members extending upwardly from the base, a top rim resting on the support members, a seat attached to the support members intermediate the base and the top rim, spike means projecting from the base and top rim and a pair of sleeves mounted on the base to receive the sidepieces of a ladder which extends from the ground to the stand and which provides support for and access to the stand.

BRIEF DESCRIPTION OF THE DRAWINGS

These and additional objects, features, and advantages of the present invention will become apparent by reference to the following detailed description of the preferred embodiments thereof in connection with the accompanying drawings herein.

FIG. 4 is a sectional view taken along lines A—A in FIG. 3.

FIG. 5 is a side view of the alternative embodiment of the present invention in the collapsed mode.

FIG. 7 is a sectional view taken along lines 7—7 in FIG. 8.

FIG. 8 is a front elevational view of the collapsible embodiment of the invention shown in a collapsed format.

DESCRIPTION OF THE PREFERRED EMBODIMENTS

Figure 1:
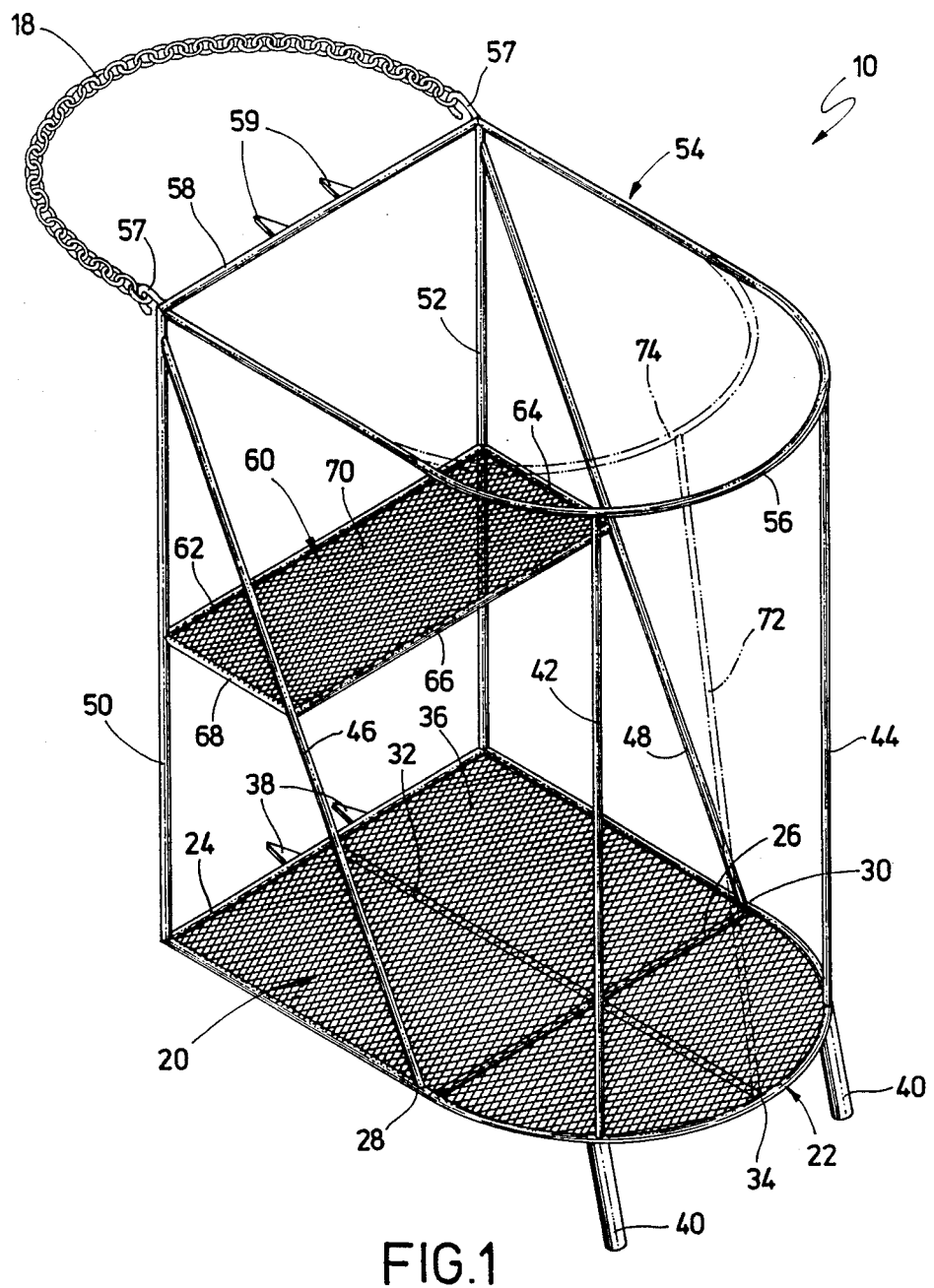
FIG. 1 is a perspective view of the hunting stand of the present invention illustrated in the non-collapsible embodiment for rifle hunting without the opaque mat on the floor and the camouflage cover, and with the top rail location for bow hunting shown in hidden line format.
Figure 2:
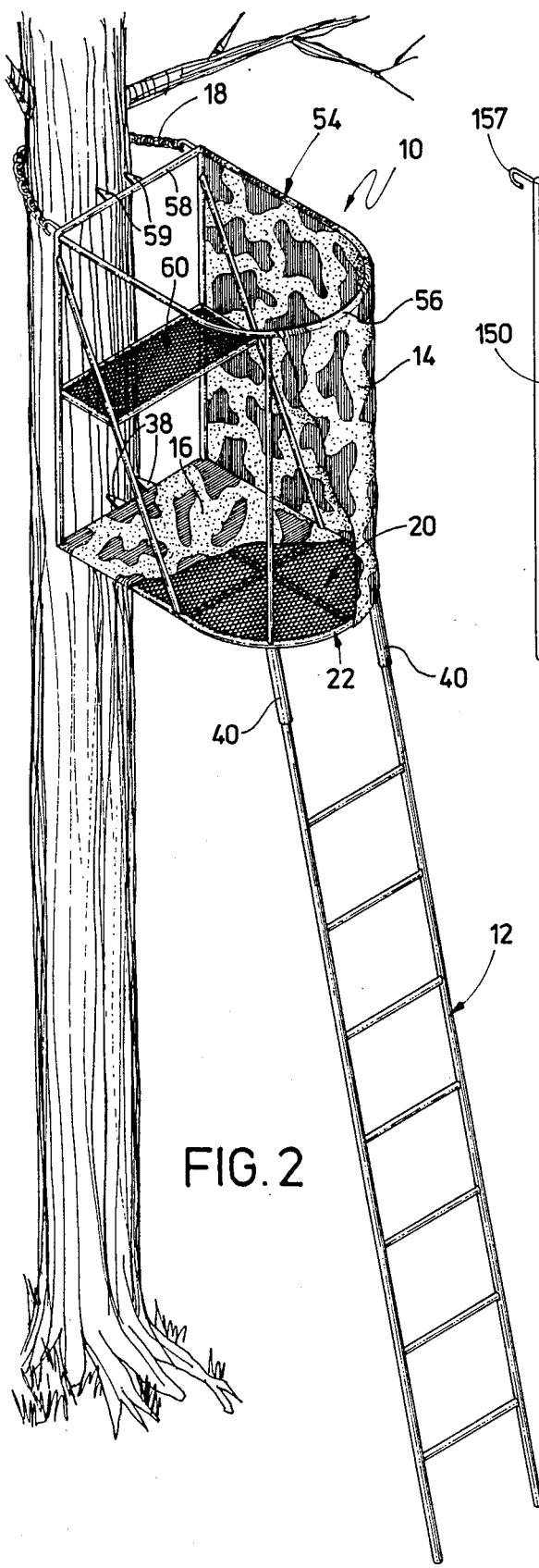
FIG. 2 is a perspective view of the hunting stand of the present invention mounted in a tree.
Figure 6:
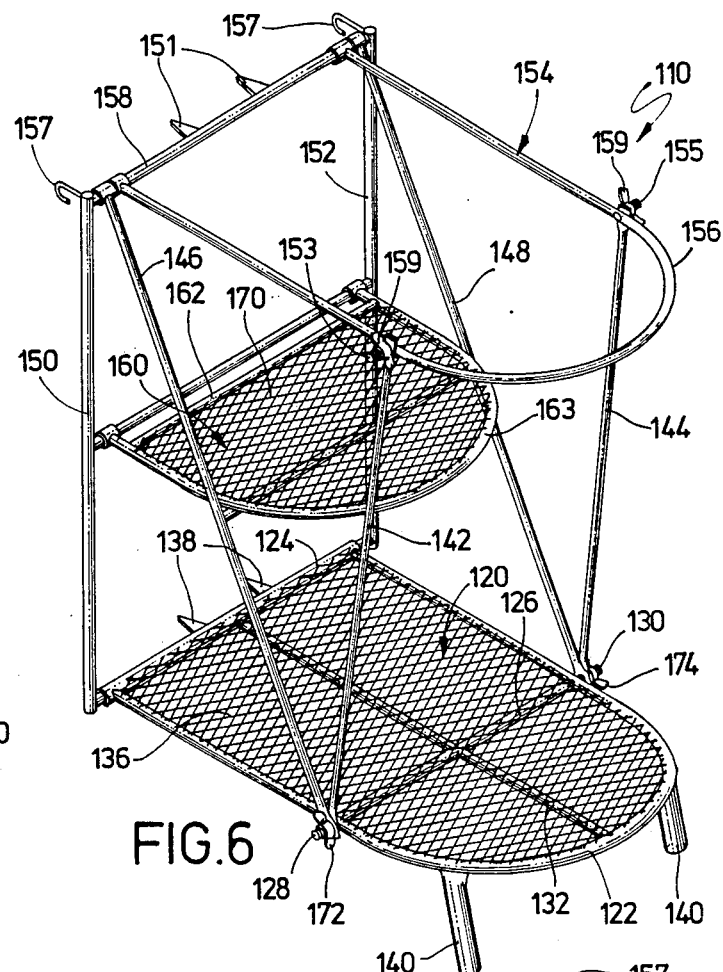
FIG. 6 is a perspective view of the collapsible embodiment of the invention illustrated fully erected.

Referring to FIG. 1, one embodiment of the hunting stand of this invention is indicated generally by the reference number 10 in a perspective view without the opaque mat on the floor and the camouflage cover on the frame (FIG. 2).

The stand has a base generally designated by reference number 20 comprising a front rim arc 22 having the approximate shape of a semi-circle, a rear member 24, which extends between the ends of the rim 22, a member 26 extending between points 28 and 30 on rim 22, and a member 32 extending between rear member 24 and point 34 on the rim 22. The above-described parts of the base 20 define a plane surface which, when covered by a wire mesh 36 functions as a floor for the stand 10.

A pair of spikes 38 project outwardly from the base rear member 24 and function to engage the tree where the stand is erected to provide stability and support. A pair of sleeves 40 project downwardly and outwardly from the base rim 22. The sleeves 40 are designed to receive the sidepieces of a ladder 12 (FIG. 2) which will extend to the ground and provide support and stability for the stand 10.

A plurality of support members 42, 44, 46, 48, 50 and 52 extend upwardly from the base as indicated.

A top rail generally indicated by the reference number 54 is supported by the support members 42-52 and comprises a front rim 56 having the approximate shape of a semi-circular arc, and a straight rear member 58 which extends between the ends of the rim 56. A pair of hooks 57 are attached to the top rail 54 and function to hold the stand in an elevated position as hereinafter described.

A seat generally indicated by the reference number 60 is supported by frame members 46, 48, 50 and 52 at a convenient location intermediate the base 20 and the top rail 54. The seat 60 comprises frame members 62, 64, 66, and 68 which define a plane surface for a wire mesh 70.

In the embodiment of the invention illustrated in FIG. 1, the frame members used to make the base, top rail, seat frame members etc., comprise lightweight hollow metal tubing and the joints are welded together to make a rigid structure. Such a stand having the approximate dimensions of 27" wide by 35" long by 36" high weighs approximately 21 pounds.

The embodiment of the invention illustrated in FIG. 1 is designed for use by rifle hunters who need ample space inside the top rail 56 to stand and aim the rifle. A bow hunter, on the contrary, will not need as much space inside the top rail 54 and, in fact, will want to lean against the front rim 56 while holding the bow outside the top rail 54 for drawing and shooting. An alternative embodiment designed for use by bow hunters is shown in FIG. 1 in hidden line format. In this bow stand embodiment, frame support members 42 and 44 are deleted and replaced by a single frame support member 72 extending upwardly and inwardly from the mid-point of base front rim 22 to the mid-point of the top front rim 74 which is somewhat recessed or smaller with respect to the top front rim 56 which is used in the rifle stand embodiment. If desired, it would be possible to construct a combination rifle-bow hunting stand having a moveable top rail 74 whereby a single stand could be used for either rifle or bow hunting.

Referring to FIG. 2, the stand of the present invention is shown mounted for use in a tree and with the camouflage frame cover 14 and the rubber floor mat 16 and the ladder 12 in place.

Referring to FIGS. 3, 4, 5, 6, 7 and 8 another embodiment of the invention having a collapsible feature is illustrated.

Figure 3:
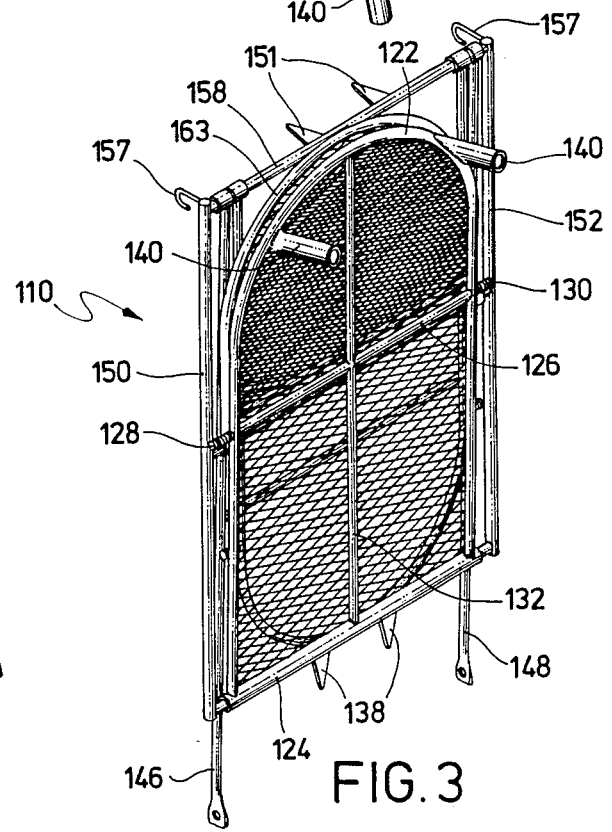
FIG. 3 is a top view of the alternative embodiment of the present invention which is collapsible.

The collapsible stand is indicated generally by the reference number 110. The stand has a base or platform generally designated by reference number 120 comprising a front rim arc 122 having an approximately semi-circular shape, a straight rear member 124 which extends between the ends of the rim 122, a straight member 126 which extends between points 128 and 130 on platform rim 122, and a straight member 132 extending between platform rear member 124 and platform rim 122. The above-described parts of the base or platform 120 define a plane surface which, when covered by a wire mesh 136 functions as a floor for the stand 110. As hereinafter described, the platform 120 is rotatable between a horizontal or deployed for use position illustrated in FIG. 6 and a substantially vertical position when the stand is collapsed or folded for transport or storage as illustrated in FIG. 3.

A pair of spikes 138 project rearwardly from base rear member 124 and function to engage the tree where the stand is erected to provide stability and support for the stand. A pair of sleeves 140 project downwardly from the base rim 122, and are designed to receive the sidepieces of a ladder 12 which will extend between the sleeves and the ground to provide support and stability for the stand.

A top rail generally indicated by the reference number 154 comprises a front rim 156 having an approximately semi-circular shape and a straight rear member 158 which extends between the ends of the rim 156. The top rail front rim member 156 and rear member 158 define a plane surface which is rotatable from the horizontal deployed for use position illustrated in FIG. 6 upwardly and rearwardly approximately 270 degrees to a substantially vertical position (FIG. 4) when the stand is collapsed for transport and storage as hereinafter described (FIG. 3).

A pair of vertical support members 142 and 144 (FIG. 6) extend upwardly from points 128 and 130 on platform rim 122 to points 153 and 155 on top rail 154. The vertical members 142 and 144 are releasably connected between points 128 and 153 and 130 and 155, respectively, by threaded bolts and wing nuts as shown. The vertical support members 142 and 144 support the top rail 154 when it is deployed for use in the horizontal position (FIG. 6), and members 142 and 144 are disconnected from the stand when it is collapsed for storage and transport (FIG. 3).

Another pair of vertical support members 146 and 148 extend between points 128 ant! 130 on the platform rim 122 and the ends of top rail rear member 158. A horizontal support member 166 extends between vertical supports 146 and 148 at a point intermediate the ends of those support members. The horizontal member 166 provides a support for a seat 160 hereinafter described. The vertical support members 146 and 148 are rotatably connected at their upper ends and are releasably connected by wing nuts at their lower ends, whereby the vertical supports 146 and 148 and the interconnected horizontal support 166 define a plane surface which is rotatable from an inclined position illustrated in FIG. 6 when deployed for use approximately 315 degrees upwardly and rearwardly (FIG. 5) to a substantially vertical position when the stand is collapsed for transport and storage (FIG. 3).

Another pair of vertical support members 150 and 152 extend upwardly from the ends of platform rear member 124 to the ends of top rail rear member 158. The platform rear member 124 and top rail rear member 158 are rigidly connected to the vertical support members 150 and 152 to define a vertical plane surface which functions as the rear of the hunting stand when deployed and about which the stand members are folded when it is collapsed for storage and transport (FIG. 3). A pair of hooks 157 located at the ends of top rail rear member 158 provide a means for attaching a chain 18 or other securing means which function to hold the stand in an elevated position as hereinafter described.

A seat generally indicated by the reference number 160 comprises a straight member 162 which is pivotally mounted between vertical support members 150 and 152, and a semi-circular rim 163 which defines a plane surface having a wire mesh 170 thereon. The seat 160 is rotatable from a horizontal position where it rests on horizontal member 166 (FIG. 6) when the stand is deployed for use through approximately 90 degrees to a vertical position when the stand is collapsed for storage and transport (FIG. 3).

A pair of spikes 151 rearwardly from top rim rear member 158.

The collapsed hunting stand is illustrated in FIG. 3. When it is desired to unfold the stand for use, the platform 120 is rotated from its vertical stored position approximately 90 degrees to the horizontal position illustrated in FIG. 6. Next, the vertical support members 146 and 148, and the interconnected horizontal support member 166 are rotated (FIG. 5) from the vertical, stored position on the rear side of the stand approximately 315 degrees to the position shown in FIG. 6. Next, the top rail 154 is rotated approximately 270 degrees from its stored vertical position rearwardly of the stand to its horizontal position illustrated in FIG. 6. Next, the vertical support members 142 and 144 are attached to the top rail 154 and the bottoms of support members 142 and 144, along with the bottoms of support members 146 and 148 are attached at points 128 and 132 to the platform rim 122. Next, the seat 160 is rotated from its vertical, stored position to the horizontal position shown in FIG. 6, and the stand is ready for erection in a tree or other elevated position. The camoflage cover 14 and the floor mat 16 may be conveniently assembled after the stand is in place.

To use the stand of the present invention, the side pieces of the ladder are inserted into sleeves 40 and the ladder 12 and stand is lifted so that the stand is supported by the ladder against a tree. The hunter then climbs the ladder and enters the stand wherein the added weight will cause the spikes 38 to engage the trees for additional vertical support. Finally, a chain 18 is connected around the tree and to hooks 57 to provide for lateral stability. A turnbuckle (not shown) or other device may be used to tighten the chain to further secure the stand in the elevated position.

Thus, it will be readily seen that the present invention provides a hunting stand which is strong but lightweight, portable, collapsible, durable, stable, comfortable, and safe to use. It will also be seen that the hunting stand accomplishes all of the objects of this invention, and others, including many advantages of great practical and commercial importance.

While various changes may be made in the detailed construction, it is understood that such changes will be within the spirit and scope of the present invention.

What is claimed is:

1. A portable hunting stand for erection in a tree or other elevated position comprising: a base designed to form a plane surface for use as a floor; a plurality of frame members adapted to engage and be
    supported by said base and extending upwardly therefrom; a top rail supported by said frame members and defining an
    enclosed area above said base and within said frame members;
    a seat supported by said frame members at a position intermediate said base and said top rail; and
    sleeves projecting outwardly from said base and adapted to receive the sidepieces of a ladder whereby said ladder will extend from said stand to the ground to provide stability and support to said stand.

2. The hunting stand of claim 1 wherein said base comprises a wire mesh floor surface.

3. The hunting stand of claim 1 further comprising spike means projecting outwardly from said base for engaging a tree to provide stability and support to said stand.

4. The hunting stand of claim 1 wherein said base, said frame members, said seat and said top rail are welded together to form a rigid stand.

5. The hunting stand of claim 1 further comprising hooks attached to said top rail and a chain useful with said hook to encircle said tree and provide stability and support for said stand.

6. A hunting stand for erection in a tree or other elevated position comprising
    a rear frame forming a vertical plane surface having parallel top and bottom members and parallel side members;
    a platform forming a plane surface and rotatably connected to said bottom of said rear frame whereby said platform is capable of rotation from a deployed, horizontal position to a substantially vertical position adjacent said rear frame;
    a seat support comprising a pair of parallel straight members and a horizontal member connected intermediate the ends of said straight members, said straight members being rotatably connected to said top of said rear frame whereby said seat support is capable of rotation from a deployed, inclined position on one side on said rear frame to a collapsed, substantially vertical position on the other side of said rear frame;
    a said rotatably connected between said rear frame side members whereby said seat is capable of rotatable between a collapsed position coplaner with said rear frame to a deployed, horizontal position whereby said seat rests on said horizontal member of said seat support;
    a top rail forming a plane surface and rotatably connected to said top member of said rear frame whereby said top rails is capable of rotation from a deployed, horizontal position on one side of said rear frame to a collapsed, substantially vertical position on the other side of said rear frame;
    sleeves projecting outwardly from said platform and adapted to receive the sidepieces of a ladder whereby said ladder will extend from said stand to the ground to provide stability and support to said stand.

* * * * *